US008960109B2

(12) United States Patent
Friggstad

(10) Patent No.: US 8,960,109 B2
(45) Date of Patent: Feb. 24, 2015

(54) PRODUCT DISTRIBUTION SYSTEM FOR FARM IMPLEMENT

(71) Applicant: CNH Canada, Ltd., Saskatoon, Saskatchewan (CA)

(72) Inventor: Terrance A. Friggstad, Grasswood (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 14/146,271

(22) Filed: Jan. 2, 2014

(65) Prior Publication Data

US 2014/0105695 A1    Apr. 17, 2014

Related U.S. Application Data

(62) Division of application No. 12/985,565, filed on Jan. 6, 2011, now Pat. No. 8,635,963.

(51) Int. Cl.
*A01C 7/00* (2006.01)
*A01C 7/20* (2006.01)
*A01C 7/08* (2006.01)

(52) U.S. Cl.
CPC .. *A01C 7/20* (2013.01); *A01C 7/084* (2013.01)
USPC ........................................................ 111/175

(58) Field of Classification Search
CPC .................................. A01C 7/20; A01C 7/084
USPC .................. 111/170–185, 200, 900; 221/211; 701/50
See application file for complete search history.

(56) References Cited

U.S. PATENT DOCUMENTS

| 1,889,163 | A | 11/1932 | Vogel-Jorgensen |
|---|---|---|---|
| 3,355,221 | A | 11/1967 | Reuter |
| 3,490,654 | A | 1/1970 | Fischer |
| 4,191,500 | A | 3/1980 | Oberg |
| 4,210,260 | A | 7/1980 | Luttrell |
| 4,280,419 | A | 7/1981 | Fischer |
| 4,432,675 | A | 2/1984 | Machnee |
| 4,662,799 | A | 5/1987 | Paul |
| 5,265,547 | A | 11/1993 | Daws |
| 6,164,222 | A | 12/2000 | Mayerle |
| 6,283,679 | B1 | 9/2001 | Gregor et al. |
| 7,182,029 | B2 | 2/2007 | Johnson et al. |
| 7,285,070 | B2 | 10/2007 | Mayerle |
| 7,373,890 | B2 | 5/2008 | Kowalchuk |
| 7,555,990 | B2 | 7/2009 | Beaujot |
| 2012/0174843 | A1 | 7/2012 | Friggstad |
| 2012/0301231 | A1 | 11/2012 | Jagow |

FOREIGN PATENT DOCUMENTS

| DE | 019841090 A1 | 3/2003 |
|---|---|---|
| EP | 000328858 A1 | 8/1989 |

*Primary Examiner* — Christopher J Novosad
(74) *Attorney, Agent, or Firm* — Rebecca L. Henkel

(57) ABSTRACT

A method and system enables sectional control for an air seeding system of a farm implement by exposing a main header, or selected ports of the main header, to a purging air flow when product flow through the selected ports is stopped. A plenum of air is fluidly coupled to the main header and provides a purging air flow to any exit port of the main header that has been shut off from product flow. Valves are used to selectively flow couple the exit ports of the main header to the product flow and to the purging air flow.

10 Claims, 5 Drawing Sheets

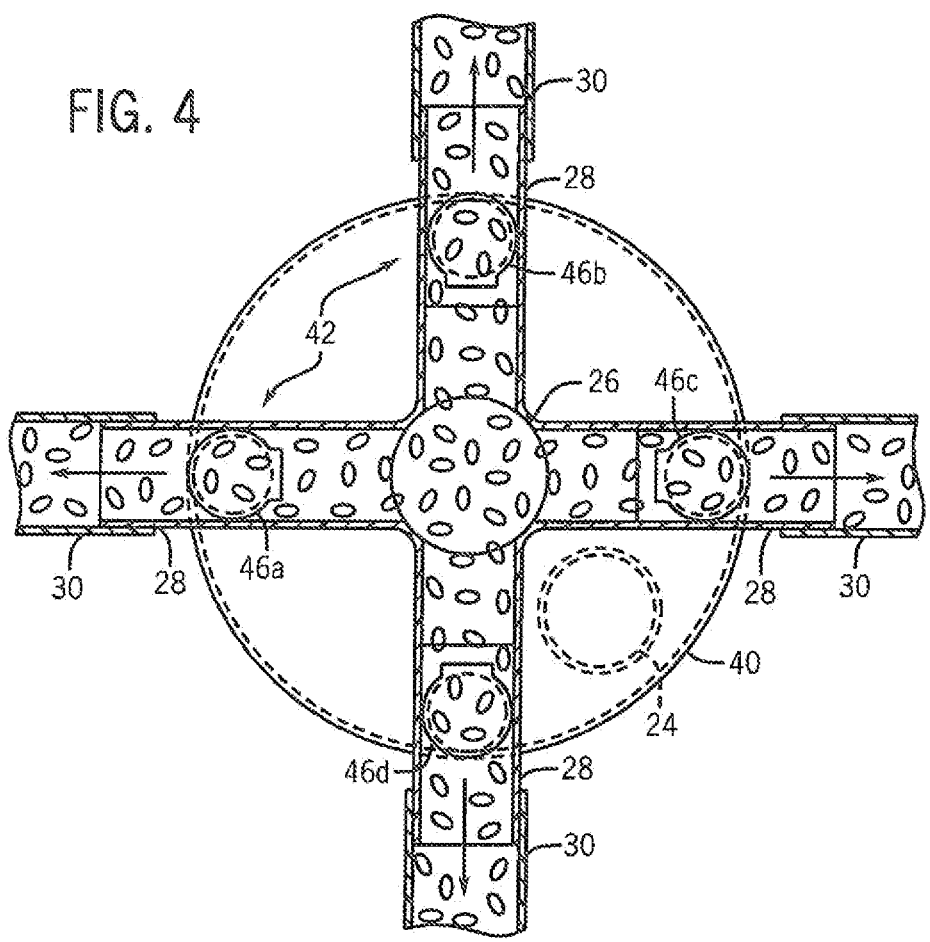

PRODUCT DISTRIBUTION SYSTEM FOR FARM IMPLEMENT

CROSS-REFERENCE TO RELATED APPLICATION

This application is a divisional of application Ser. No. 12/985,565 filed Jan. 6, 2011.

BACKGROUND OF THE INVENTION

The present invention relates to farm implements and, more particularly, to a method and apparatus for purging distribution channels for an air seeder of a farm implement.

Agricultural or farm implements that apply seed, fertilizer, or other particulate (granular) matter to a surface ("farm field") typically have one or more central hoppers or tanks that are loaded with the particulate matter. The hoppers have or are associated with a metering device, which is typically a rotating element, that meters the particulate matter from the hoppers into a set of distribution channels, such as conduits, hoses, etc., that are flow coupled to the individual row units, or seed boxes associated with the individual row units. In many implementations, a blower system provides a turbulent air stream into which the particulate matter is entrained to pass the particulate matter through the distribution channels and ultimately to the individual row units. Such air seeders can take many forms and use various configurations to apportion the correct amount of particulate matter evenly throughout the distribution channels so that the particulate matter is deposited onto the farm field in a uniform and consistent manner.

One type of air seeder uses a large conduit to convey all the metered product to a first hollow distributor or manifold at which the particulate product is divided into a number of secondary streams evenly using evenly sized and spaced outlet ports. The secondary streams are fed to secondary headers, with each secondary header providing additional division and distribution of the secondary streams before the air/product streams are fed to the individual row units.

Another type of air seeder uses a metering roller that is segmented into a number of sections, with each section of the metering roller communicating with a dedicated set of secondary headers. With this type of air seeder, the product is mechanically metered and separated into different streams or runs and each stream is fed to a secondary header that provides additional division and distribution of the air/product streams before being fed to the individual row units.

A third type of air seeder avoids the use of secondary headers and the downstream division that such secondary headers provide. These air seeders use a metering roller that is large enough to feed product to each of the row units directly.

Regardless of the type of air seeder used, due to the increasing cost of seed and fertilizer, the agronomic disadvantage and waste associated with redundant application of seed and fertilizer, and the increasing size of seed drills, efforts have been made to selectively shut off the flow of product to the secondary headers which allows the seed drill to traverse previously seeded land without necessarily reapplying seed or fertilizer while the seed drill is used to apply particulate matter to nearby unseeded land. For air seeders having segmented or direct feed metering rollers, sectional control can be achieved by preventing the flow of product to the metering roller. When starving the roller by mechanically stopping the flow of product by using a gate or similar structure or by not rotating the roller, the roller cannot meter product downstream.

It will thus be appreciated that achieving sectional control is relatively straightforward for air seeders having segmented or direct feed metering rollers. However, for an air seeder that uses a distribution manifold and several downstream secondary headers to distribute particulate matter to the individual row units, sectional control is considerably more difficult. That is, if air flow is stopped to one of the outlet ports of the main header or manifold, the downstream channel may become plugged by the residual product thereby causing an issue when the air flow through the stopped outlet port resumes. If the channel becomes plugged, the application devices that are fed by the plugged channel will not be able to apply product to the field and will result in inconsistent and undesirable application of the seed and/or fertilizer.

SUMMARY OF THE INVENTION

The present invention provides a method and system for sectional control of an air seeding system that uses a main header or distribution manifold to distribute product, such as seed or fertilizer, to a plurality of secondary headers that likewise distribute the product for delivery to application devices, such as row units, or the seed boxes for the row units. The present invention enables sectional control for such an air seeding system by providing an apparatus and method for purging a channel of residual product when air flow to the channel through the header is stopped. In one implementation, the invention provides a plenum of air that provides a purging air flow to a distribution channel that has been shut off from a product air flow. A two position valve is used to selectively flow couple the channel to the primary product air flow and to the purging air flow. In one implementation, the blower that is used to provide the air flow for delivery product is also used to provide a volume of air to the plenum that can be used to purge the closed channel of residual product.

Therefore, in accordance with one aspect of the invention, an apparatus for a product distribution system of a farm implement is comprised of a header having an inlet and a plurality of outlets. The inlet is configured to receive product entrained in an air flow and the plurality of outlets are configured to pass respective portions of the product. A plenum having a volume of air and selectively in fluid communication with the plurality of outlets of the header is provided and is configured to provide a purging air flow to one or more of the plurality of outlets when in fluid communication with the one or more of the plurality of outlets.

In accordance with another aspect of the invention, a product distribution system for a farm implement includes a distribution manifold having a fluid inlet and a plurality of outlets, an entrained fluid flow containing particulate matter entrained in air, and a purging fluid flow free of the particulate matter to which at least one of the plurality of outlets is automatically exposed to when the at least one of the plurality of outlets is fluidly isolated from the entrained fluid flow.

The invention is also embodied in a method of purging a product distribution system of a farm implement. According to one aspect of the invention, the method includes passing entrained product through a manifold for subsequent distribution to a plurality of secondary headers for application of the entrained product onto a farm field. When desired for sectional control, the method includes selectively preventing air flow entrained with product to one of the secondary headers and simultaneously therewith, exposing the one secondary header to an air flow absent of entrained product to substantially purge the product placement devices connected to the one secondary header of product.

It will therefore be appreciated that one object of the invention is to provide a sectional control for a product metering system of a farm implement.

It is another object of the invention to provide a method and apparatus for purging a closed distribution channel of a production distribution system of a farm implement.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings:

FIG. 4 is a top section view of the main header and plenum of FIG. 3 taken along line 4-4 of FIG. 3;

DETAILED DESCRIPTION

Figure 1:
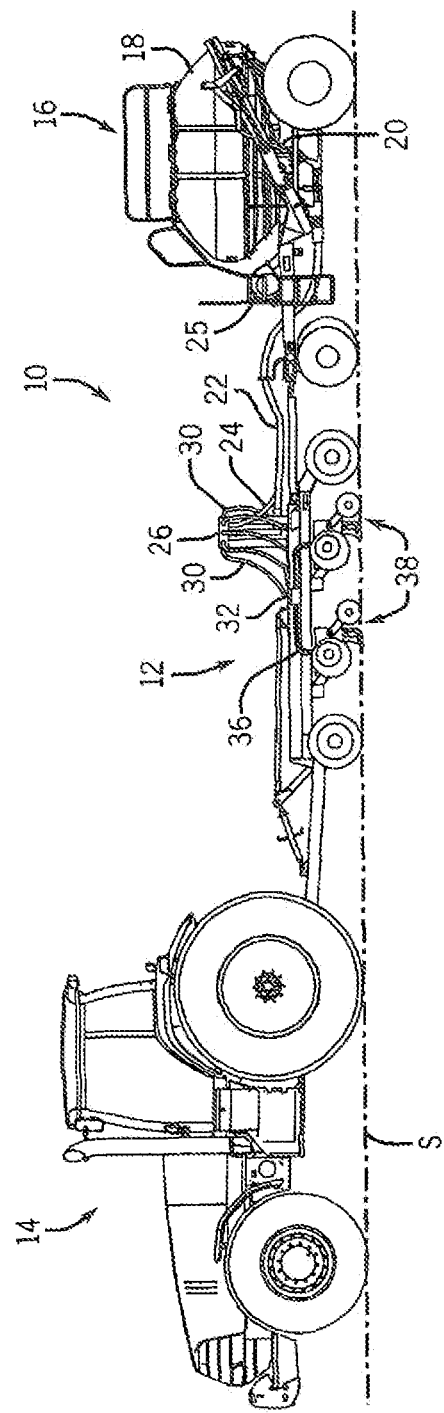
FIG. 1 is a pictorial view of a farm implement incorporating the principles of the present invention.
Figure 2:
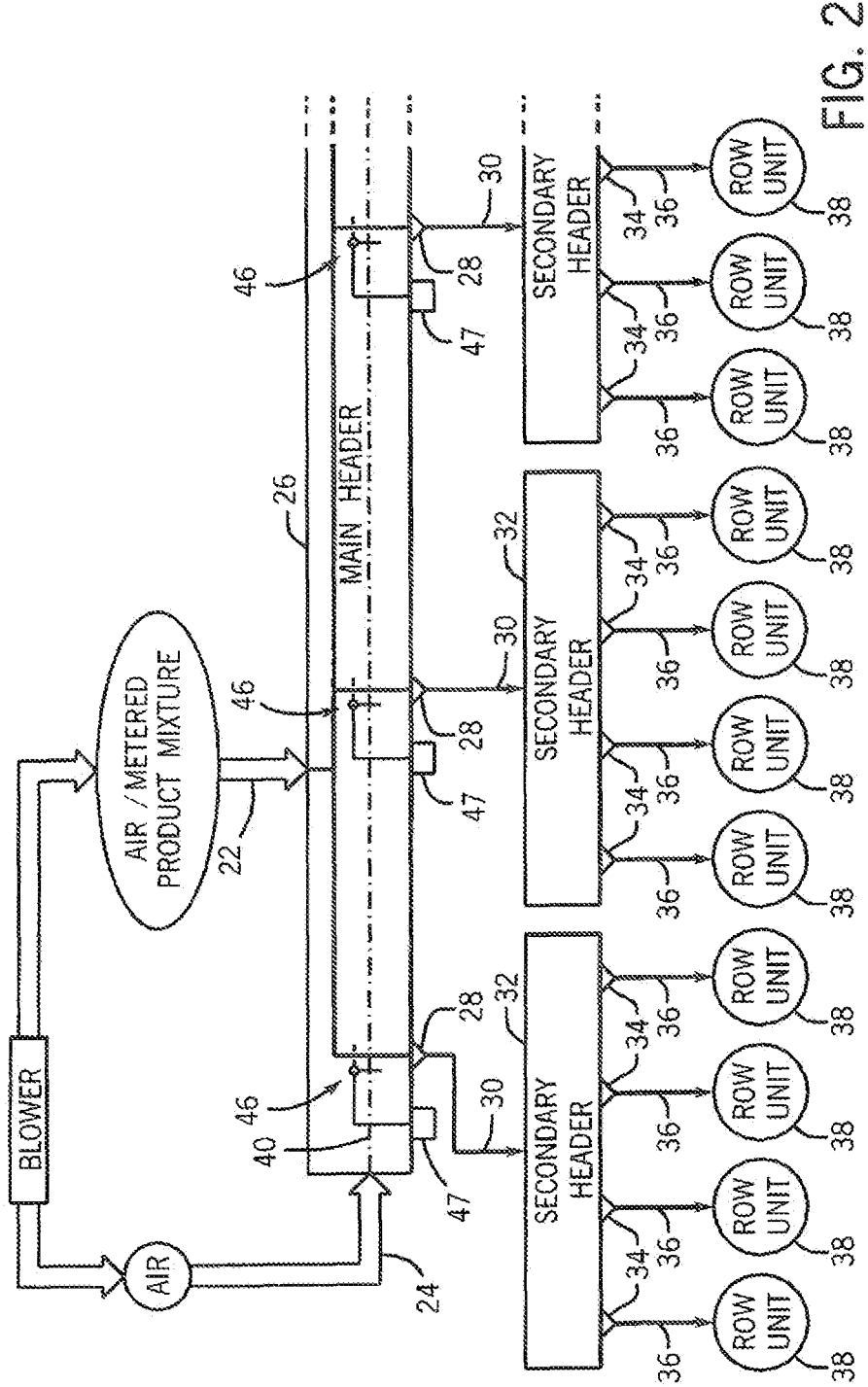
FIG. 2 is a schematic view of the product distribution system of the farm implement of FIG. 1.
Figure 3:
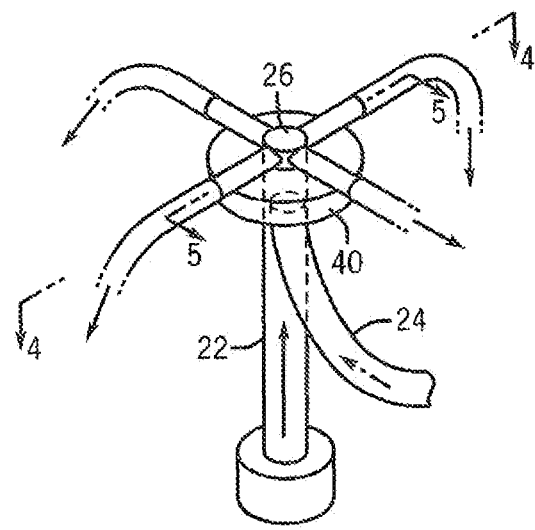
FIG. 3 is an isometric view of a main header and plenum of the product distribution system of FIG. 2.

Turning now to FIGS. 1 and 2, an air seeder 10 includes an air hoe drill 12 coupled to a towing tractor 14 in a conventional manner. As known in the art, an air cart 16 is coupled to the air hoe drill 12 and in the illustrated embodiment is towed behind the air hoe drill 12. As also known in the art, the air cart 16 has a large hopper 18 that holds a quantity of particulate matter, e.g., seed and/or fertilizer, and a metering unit 20 that meters the particulate matter from the hopper 18 to the air hoe drill 12. The size of the hopper 18 may vary, but in one embodiment, the hopper 18 is sized to hold 580 bushels of particulate matter. One exemplary air cart is a Precision Air cart which is commercially available from CNH America, LLC.

In addition to being mechanically linked with the air hoe drill 12, the air cart 16 and the air hoe drill 12 are interconnected by an air/product hose 22 and an air hose 24. Air is supplied to both hoses 22, 24 by a blower assembly 25 generally mounted adjacent the front of the hopper 18 and adjacent the metering unit 20. Alternately, the blower assembly 25 may be mounted rearward of the hopper or adjacent a side of the hopper. As known in the art, the blower creates a turbulent air flow that forces the particulate matter metered by metering unit 20 into and along air/product hose 22. The particulate matter is entrained in the air flow created by the blower and communicated from the air cart 16 through hose 22 to a main header or manifold 26 that is mounted to and supported by the air hoe drill 12. In the illustrated embodiment, the main header 26 is vertically oriented but it is understood that other orientations are possible.

The main header 26 is a hollow conduit fluidly coupled in a conventional manner to hose 22 so that the product/air mixture P passed through hose 22 is delivered to the main header 26 and, more particularly, to a set of outlet or exit ports 28 formed in the main header 26. The exit ports are equiradially spaced about the upper end of the main header 26 and the openings of the exit ports 28 are equally sized.

In operation, the product/air mixture is led to the main header 26 and distributed evenly by the main header 26 to a set of primary conduits or hoses 30 that are flow coupled to the outlet ports 28. The primary conduits 30 are flow coupled to a set of secondary headers 32. The secondary headers 32 are similar to the main header 26 in that each secondary header 32 has a set of outlets 34, with each outlet flow coupled to a secondary conduit 36. Each secondary conduit 36 passes its portion of the air/product mixture to a row unit 38 which is configured in a conventional manner to deposit the particulate matter onto the seeding surface S.

Figure 5:
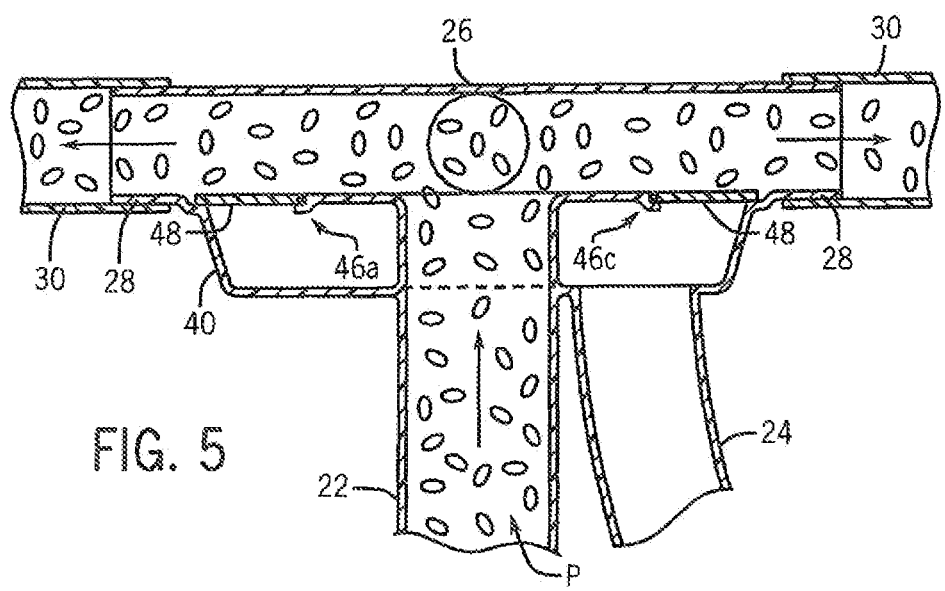
FIG. 5 is a section view of the main header and plenum taken along line 5-5 of FIG. 3.
Figure 6:
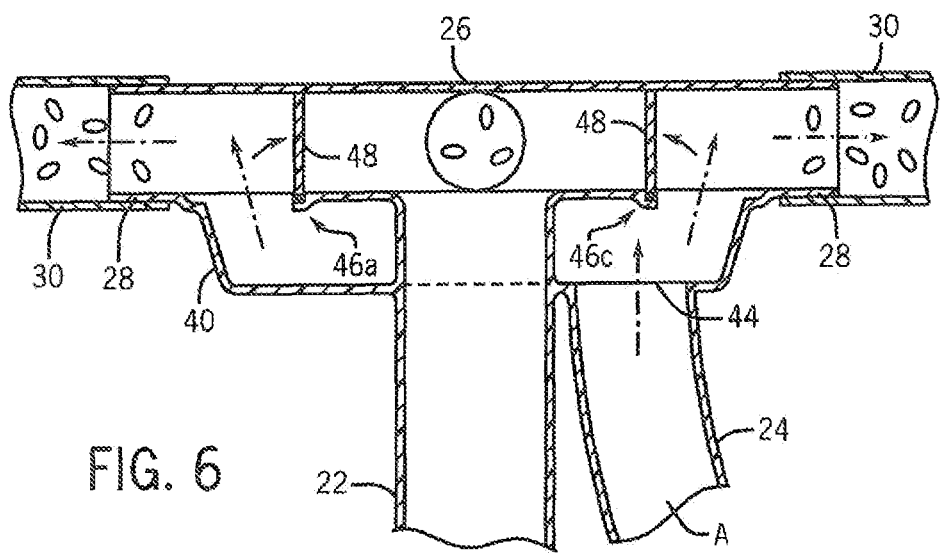
FIG. 6 is a section view of the main header and plenum similar to the view shown in FIG. 5 but with exit ports of the main header fluidly exposed to a purging air flow according to one aspect of the invention.

To provide sectional control but also prevent clogging of the conduits downstream of the main header 26, the present invention provides, in combination, a plenum 40 and a valve arrangement 42, as shown in FIGS. 4 through 6. The plenum 40 is mounted adjacently beneath the main header 26 and includes an air inlet 44 that is flow coupled to the air hose 24. In this regard, the plenum 40 is fed air from the same blower assembly that provides the forced air for passing particulate matter through hose 22.

In the illustrated example, the valve arrangement 42 includes valves 46a, 46b, 46c, and 46d and each is configured to selectively expose a respective main header exit port to either the product/air mixture supplied to the main header 26 by hose 22 or to the volume of air contained in the plenum 40 that is fed air via hose 24. In one implementation, each valve has a gate 48 that is movable between a first position, shown in FIG. 5, in which the exit port is in fluid communication with the air/product flow P and a second position, shown in FIG. 6, in which the exit port is in fluid communication with the plenum 40. It is contemplated that the valves could be activated in a known or to be developed manner, such as by a linear or rotary actuator, generally shown at 47. Moreover, while a gate 48 is shown, it is understood that any known or to be developed mechanism could be used to selectively expose the exit port to the air/product mixture and the plenum of air. In this regard, when a valve is moved from the first or "open" position to the second or "closed" position, the exit port associated with that valve when will be closed off to the supply of particulate matter in the entrained air flow, as shown in FIG. 6. As such, the secondary header flow coupled to that exit port will not be supplied product and the row units fed from that secondary header will not be fed product. However, to prevent clogging of the secondary header, the primary conduit that feeds the secondary header, and the secondary conduits, when the valve is moved to the second position, the exit port is exposed to the plenum of air A which functions to purge the downstream components of any particulate matter. When the valve is in the closed position, air only is fed to the row units associated with the closed main header exit port. Thus, the row units will not deposit product thereby enabling the implement operator to selectively control the application of particulate matter onto the seeding surface. This sectional control is believed to be particularly advantageous in avoiding the reapplication of particulate matter to a previously seeded or fertilized area. In another embodiment, the valve arrangement includes tandem pairs of butterfly valves. Other valve types could also be used.

It will be appreciated that the main header described herein may take a form different from that shown and described and thus the present invention is not limited to the specific main header design shown in the figures. Additionally, while the plenum has been described as being mounted beneath the main header, it is understood that other mounting arrangements could be used. It is also understood that other mechanisms could be used to selectively expose outlet ports of the main header to a purging volume of air. Further, it is contemplated that the present invention could be used with one or more of the secondary headers.

Additionally, in a preferred embodiment, the speed or the displacement of the metering assembly is adjusted when any of the exit ports of the main header is closed to the product/air mixture. Adjusting operation of the metering assembly is preferred so that open ports do not receive excess particulate matter when any of the other ports are closed. It is contemplated that a controller (not shown) could receive feedback with respect to the number of closed exit ports and adjust operation of the metering assembly automatically. For example, if twenty percent of the total number of exit ports of the main header is closed to the air/product mixture, the metering assembly is slowed by twenty percent.

Many changes and modifications could be made to the invention without departing from the spirit thereof. The scope of these changes will become apparent from the appended claims.

The invention claimed is:

1. A product distribution system for a farm implement, comprising:

a distribution manifold having a fluid inlet and a plurality of outlets;

an entrained fluid flow containing particulate matter entrained in air; and a purging fluid flow substantially free of the particulate matter to which at least one of the plurality of outlets is automatically exposed to when the at least one of the plurality of outlets is fluidly isolated from the entrained fluid flow; and a set of valves operatively associated with the plurality of outlets, each valve movable between a first position wherein the fluid inlet of the distribution manifold is in fluid communication with a corresponding outlet of the distribution manifold so as to allow product entrained in the entrained fluid flow to flow through the corresponding outlet and a second position wherein the inlet of the distribution manifold is isolated from corresponding outlet of the distribution manifold so as to prevent product entrained in the fluid flow from flowing to the corresponding outlet and wherein the purging fluid flow is in fluid communication with the corresponding outlet of the distribution manifold so as to allow air from the purging fluid flow to pass through the corresponding outlet of the valve.

2. The system of claim 1 further comprising:

a hopper for holding particulate matter;

a blower operative to entrain particulate matter in the air flow and pass the entrained particulate matter to the inlet of the distribution manifold; and a set of valves, each configured to selectively expose a respective outlet to either the entrained air flow or the purging air flow.

3. The system of claim 2 wherein the manifold has more than two outlets.

4. The system of claim 3 wherein the manifold includes a manifold body supported by an upright stack, wherein the upright stack has a hollow portion that is fluidly interconnected to the manifold body and the entrained fluid flow.

5. The system of claim 2 wherein the blower provides the purging fluid flow.

6. The system of claim 5 further comprising a plenum having a fluid inlet flow coupled to the blower and a fluid outlet flow coupled to the plurality of outlets.

7. The system of claim 2 wherein each valve has a movable member movable between a first position in which the movable member blocks the purging fluid flow to a respective outlet and a second position in which the movable member opens the respective outlet to the purging fluid flow.

8. The system of claim 7 wherein the movable member exposes the respective outlet to the entrained fluid flow when in the first position and closes the respective outlet to the entrained fluid flow when in the second position.

9. The system of claim 1 further comprising a blower having a first output communicating with a source of particulate matter for providing the entrained fluid flow and a second output isolated from the source of particulate matter for providing the purging fluid flow.

10. The system of claim 1 wherein purging fluid flow has less particulate therein than the entrained fluid flow.

* * * * *